US012688120B2

(12) United States Patent
Singer et al.

(10) Patent No.: US 12,688,120 B2
(45) Date of Patent: *Jul. 21, 2026

(54) OPTIMIZATION OF AN ACTIVE RANGE OF MSETS STORED IN A COMPRESSED ADDRESS TABLE

(71) Applicant: Sandisk Technologies, Inc., Milpitas, CA (US)

(72) Inventors: Nava Singer, Petach tikwa (IL); Jonathan Journo, Shaarey tikwa (IL)

(73) Assignee: Sandisk Technologies, Inc., Milpitas, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/950,574

(22) Filed: Nov. 18, 2024

(65) Prior Publication Data

US 2025/0077421 A1      Mar. 6, 2025

Related U.S. Application Data

(63) Continuation of application No. 18/218,854, filed on Jul. 6, 2023, now Pat. No. 12,174,736.

(60) Provisional application No. 63/445,104, filed on Feb. 13, 2023.

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC .................... G06F 12/0246; G06F 2212/7201
See application file for complete search history.

(56) References Cited

U.S. PATENT DOCUMENTS

| | | | |
|---|---|---|---|
| 10,459,636 B2 | 10/2019 | Frid et al. | |
| 10,503,635 B2 | 12/2019 | Kan et al. | |
| 11,294,813 B2 | 4/2022 | Sharma et al. | |
| 2014/0068223 A1* | 3/2014 | Quintard ............ | H04L 61/5007 |
| | | | 711/203 |
| 2017/0024326 A1 | 1/2017 | Luo et al. | |
| 2019/0220416 A1* | 7/2019 | Jung ................... | G06F 12/1009 |

(Continued)

OTHER PUBLICATIONS

Chang et al.; Adaptive Range-based Address Mapping for theFlash Storage Devices with Explosive Capacity; IMCOM (ICUIMC)'14, Jan. 9-11, 2014, Siem Reap, Cambodia.

*Primary Examiner* — Chie Yew
(74) *Attorney, Agent, or Firm* — Patterson + Sheridan, LLP

(57) ABSTRACT

A controller maintains logical block address (LBA) to physical block address (PBA) mappings as mSets in a storage address table (SAT). Because the SAT may include many mappings, and, consequently, have a large size, the SAT may be stored in a distanced memory from the controller, such as a non-volatile memory device of the data storage device or a host memory buffer of a host device that is coupled to the data storage device. In order to optimize performance, a portion of the SAT may be stored as a compressed address table (CAT) in an internal memory of the controller or another volatile memory of the data storage device. During operation, the controller maintains an active range of mSets in the CAT by adding mSets to the CAT based on whether the LBA is sequential to the active range and a hit count of the active range.

20 Claims, 6 Drawing Sheets

(56) References Cited

U.S. PATENT DOCUMENTS

| | | |
|---|---|---|
| 2021/0026778 A1 | 1/2021 | Byun |
| 2021/0349830 A1 | 11/2021 | Balluchi et al. |

* cited by examiner

Figure 3:
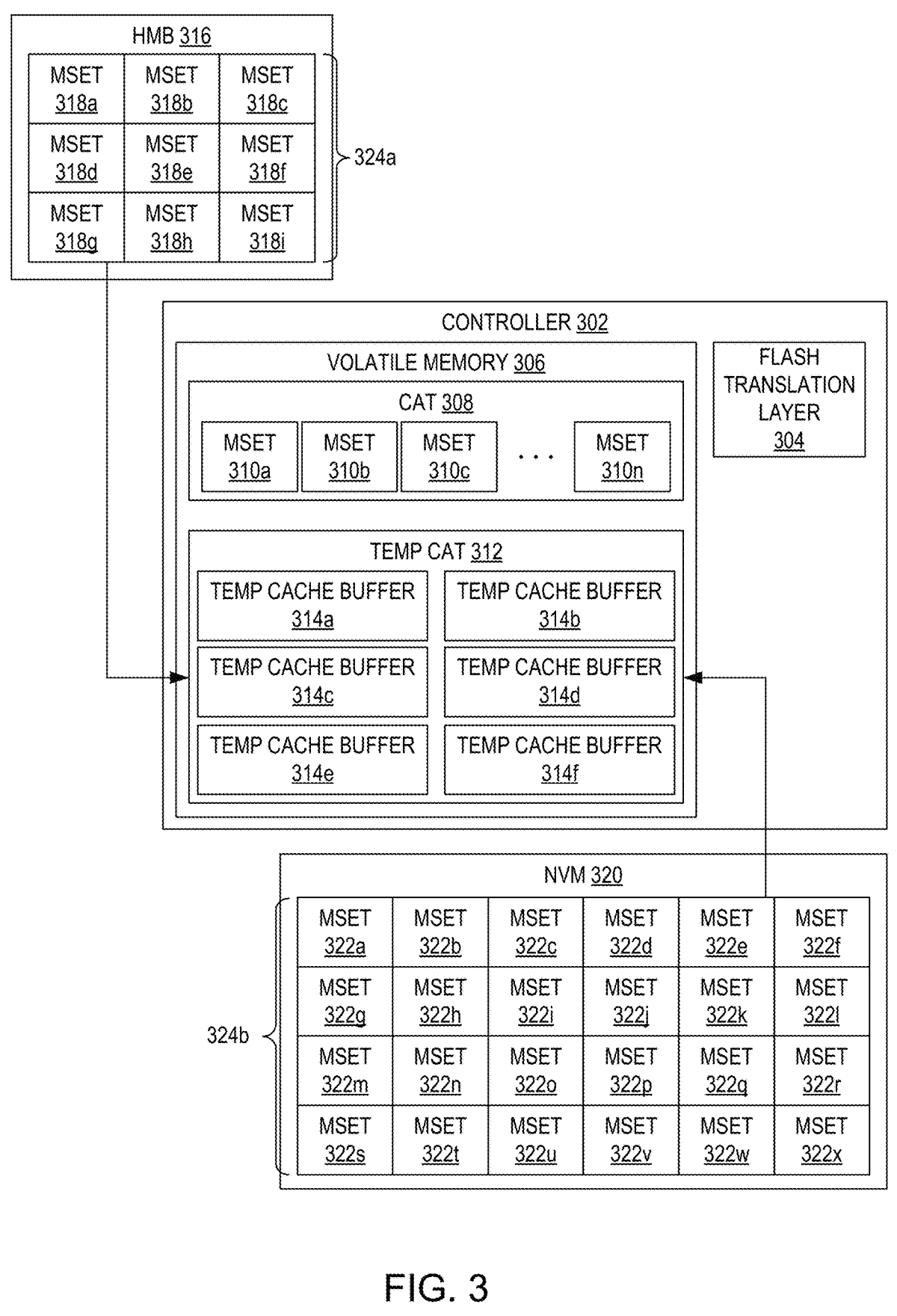

HMB 316

| MSET 318a | MSET 318b | MSET 318c |
|---|---|---|
| MSET 318d | MSET 318e | MSET 318f |
| MSET 318g | MSET 318h | MSET 318i |

324a

CONTROLLER 302

VOLATILE MEMORY 306

CAT 308

| MSET 310a | MSET 310b | MSET 310c | . . . | MSET 310n |
|---|---|---|---|---|

TEMP CAT 312

| TEMP CACHE BUFFER 314a | TEMP CACHE BUFFER 314b |
|---|---|
| TEMP CACHE BUFFER 314c | TEMP CACHE BUFFER 314d |
| TEMP CACHE BUFFER 314e | TEMP CACHE BUFFER 314f |

FLASH TRANSLATION LAYER 304

NVM 320

324b

| MSET 322a | MSET 322b | MSET 322c | MSET 322d | MSET 322e | MSET 322f |
|---|---|---|---|---|---|
| MSET 322g | MSET 322h | MSET 322i | MSET 322j | MSET 322k | MSET 322l |
| MSET 322m | MSET 322n | MSET 322o | MSET 322p | MSET 322q | MSET 322r |
| MSET 322s | MSET 322t | MSET 322u | MSET 322v | MSET 322w | MSET 322x |

| RANGE | UPPER BOUND | LOWER BOUND | STATISTICS |
|---|---|---|---|
| RANGE 1 | LBA # | LBA # | HIT COUNT |
| . . . | . . . | . . . | . . . |
| RANGE N | LBA # | LBA # | HIT COUNT |

450

RANGE N
402n
UPPER BOUND
LOWER BOUND

. . .

RANGE 1
402a
UPPER BOUND
LOWER BOUND

LBA RANGE

600

OPTIMIZATION OF AN ACTIVE RANGE OF MSETS STORED IN A COMPRESSED ADDRESS TABLE

CROSS-REFERENCE TO RELATED APPLICATIONS

The present application is a continuation of U.S. patent application Ser. No. 18/218,854, filed Jul. 6, 2023, which application claims benefit of U.S. Provisional Patent Application Ser. No. 63/445,104, filed Feb. 13, 2023, both of which are herein incorporated by reference.

BACKGROUND OF THE DISCLOSURE

Field of the Disclosure

Embodiments of the present disclosure generally relate to data storage devices, such as solid state drives (SSDs), and, more specifically, efficient management of mSets in a compressed address table (CAT) of a data storage device.

Description of the Related Art

During operation of a data storage device, a controller of the data storage device may maintain logical block address (LBA) to physical block address (PBA) mappings as mSets in a storage address table (SAT). The SAT may require a significant amount of memory space for storage. In order to decrease a manufacturing cost of data storage devices, some controllers of the data storage devices may be manufactured without a coupled dynamic random access memory (DRAM). However, the size of the SAT does not change whether the data storage device includes a DRAM coupled to the controller or does not include a DRAM coupled to the controller. The SAT may be stored in a memory outside of the controller. However, accessing the SAT stored in a memory outside of the controller may be time consuming. Thus, portions of the SAT may be cached in a CAT of the controller in order to speed up address translation operations.

For example, a time since last recently used (TLRU) algorithm may be used for the cache replacement operation. In the TLRU algorithm, a last used timestamp is saved for each mSet. When a CAT miss occurs, the oldest mSet (i.e., having the oldest timestamp) is compared against a global timestamp. If the oldest timestamp exceeds the global timestamp threshold, then the oldest mSet is evicted from the CAT. The TLRU algorithm utilizes static boundaries for each of the active ranges. However, static boundaries may not be accurate based on a tested/workload range.

Therefore, there is a need in the art to detect active ranges of mSets to optimize CAT usage.

SUMMARY OF THE DISCLOSURE

The present disclosure generally relates to data storage devices, such as SSDs, and, more specifically, efficient management of mSets in a CAT of a data storage device. A controller maintains logical block address (LBA) to physical block address (PBA) mappings as mSets in a storage address table (SAT). Because the SAT may include many mappings, and, consequently, have a large size, the SAT may be stored in a distanced memory from the controller, such as a non-volatile memory device of the data storage device or a host memory buffer of a host device that is coupled to the data storage device. In order to optimize performance, a portion of the SAT may be stored as a compressed address table (CAT) in an internal memory of the controller or another volatile memory of the data storage device. During operation, the controller maintains an active range of mSets in the CAT by adding mSets to the CAT based on whether the LBA is sequential to the active range and a hit count of the active range.

In one embodiment, a data storage device includes a memory device and a controller coupled to the memory device. The controller is configured to determine that an address associated with a received read command is not stored in a compressed address table (CAT) of the data storage device, where the CAT comprises one or more ranges, wherein each of the one or more ranges corresponds with at least an mSet of a storage address table (SAT), update either a lower bound or an upper bound of a range of the one or more ranges based on the address, where the range that is updated is closest to the address associated with the received read command, retrieve one or more mSets from the SAT based on the updating, where the retrieved one or more mSets comprises the address associated with the received read command, and store the retrieved one or more mSets in the CAT for subsequent address translation requests, where the controller is further configured to scan the CAT for the subsequent address translation requests.

In another embodiment, a data storage device includes a non-volatile memory device, a volatile memory device, and a controller coupled to the non-volatile memory device and the volatile memory device. The volatile memory device includes a compressed address table (CAT). The CAT stores a portion of a storage address table (SAT). The SAT stores logical block address (LBA) to physical block address (PBA) mappings. The CAT stores one or more ranges of LBA to PBA mappings. The controller is configured to determine that an address associated with a read command is not stored in the CAT, determine if the address associated with the read command is sequential to one of the one or more ranges of LBA to PBA mappings of the CAT when the address associated with the read command is not stored in the CAT, and retrieve and store an mSet storing an LBA to PBA mapping corresponding to the address associated with the read command in the CAT when the address associated with the read command is sequential to one of the one or more ranges of LBA to PBA mappings of the CAT.

In another embodiment, a data storage device includes means for storing data and a controller coupled to the means for storing data. The controller is configured to adjust a stored range of mSets in a compressed address table (CAT) based on determining that an mSet comprising an address associated with a read command is sequential to the stored range.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a schematic block diagram illustrating usage of a storage address table (SAT) by a controller, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as SSDs, and, more specifically, efficient management of mSets in a CAT of a data storage device. A controller maintains logical block address (LBA) to physical block address (PBA) mappings as mSets in a storage address table (SAT). Because the SAT may include many mappings, and, consequently, have a large size, the SAT may be stored in a distanced memory from the controller, such as a non-volatile memory device of the data storage device or a host memory buffer of a host device that is coupled to the data storage device. In order to optimize performance, a portion of the SAT may be stored as a compressed address table (CAT) in an internal memory of the controller or another volatile memory of the data storage device. During operation, the controller maintains an active range of mSets in the CAT by adding mSets to the CAT based on whether the LBA is sequential to the active range and a hit count of the active range.

Figure 1:
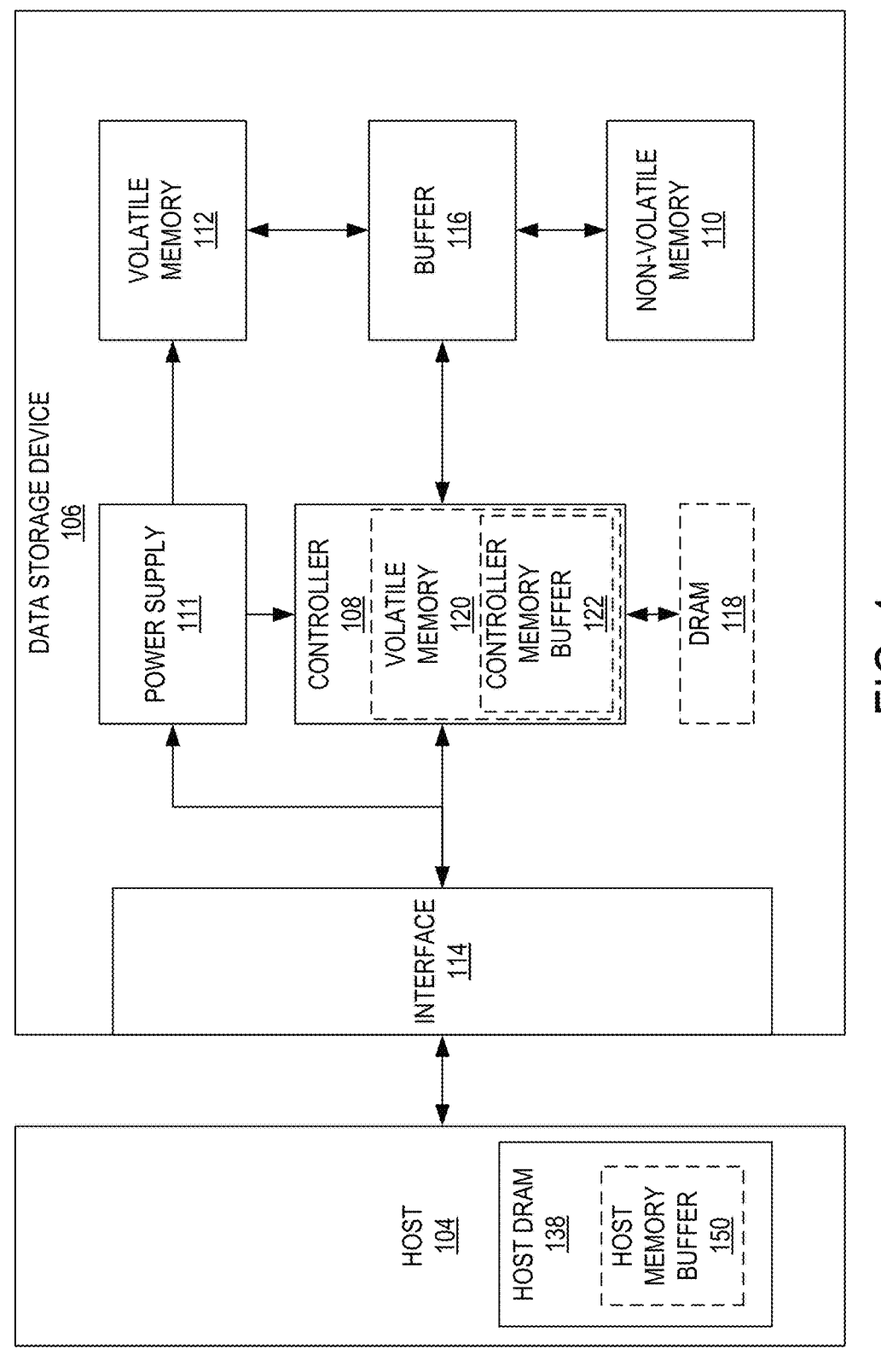
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
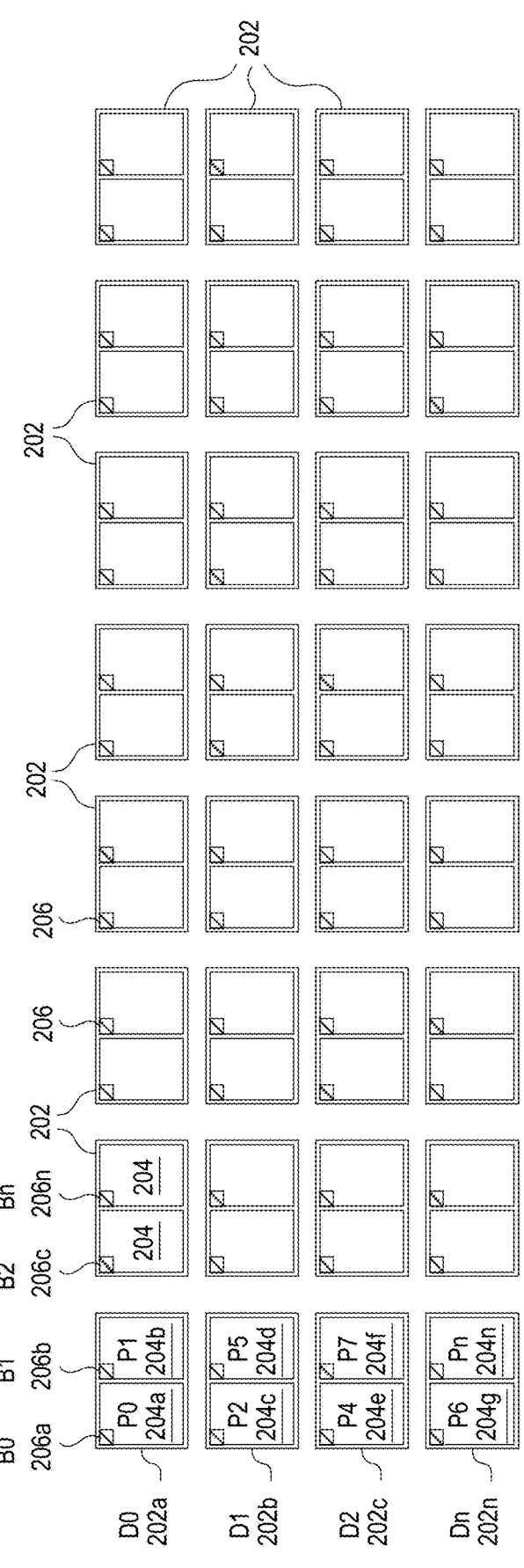
FIG. 2 is an illustration of a memory device, according to certain embodiments.

FIG. 2 is an illustration of a memory device 200, which may be the NVM 110 of FIG. 1, according to certain embodiments. The memory device 200 includes a plurality of dies 202a-202n, collectively referred to as dies 202, where each die of the plurality of dies 202a-202n includes a first plane 204a and a second plane 204b, collectively referred to as planes 204. Each of the planes 204 includes a plurality of blocks 206a-206n, collectively referred to as blocks 206. While 32 dies 202 are shown in the memory device 200, any number of dies may be included. Furthermore, the dies 202 may be split into a plurality of sets of dies, where each of the sets of dies has one or more distinct dies of the plurality of dies 202a-202n. For example, a first die 202a may be in a first set of dies and a second set of dies may include a second die 202b and a third die 202c. Each of the sets of dies may be associated with a flash channel of a controller, such as the controller 108 of FIG. 1. The controller 108 may be configured to read data from and write data to the memory device 200. Likewise, groupings of blocks 206 (which may include one or more blocks) may be referred to as a jumboblock.

FIG. 3 is a schematic block diagram illustrating usage of a storage address table (SAT) (i.e., a first SAT 324a and a second SAT 324b, collectively referred to as SAT 324) by a controller 302, according to certain embodiments. Certain elements of FIG. 3 may be similar to the storage system 100 of FIG. 1. For example, the controller 302 may be the controller 108, the HMB 316 may be the HMB 150, and the NVM 320 may be the NVM 110.

The first SAT 324a includes a plurality of mSets 318a-318i and the second SAT 324b includes a plurality of mSets 322a-322x. An mSet is a page of mappings within a master layer of mappings. The mSet is stored into an mBlock, which is a block of the master layer of mappings. It is to be understood that the number of mSets of the first SAT 324a and the second SAT 324b depicted is not intended to be limiting, but to provide an example of a possible embodiment. Furthermore, the plurality of mSets 318a-318i may be the same as the plurality of mSets 322a-322x, such that the plurality of mSets 318a-318i is a copy of the plurality of mSets 322a-322x. In other examples, the plurality of mSets 318a-318i may be a smaller portion of the plurality of mSets 322a-322x. In yet other examples, the plurality of mSets 318a-318i may be different than the plurality of mSets 322a-322x, such that when combined, the plurality of mSets 318a-318i and the plurality of mSets 322a-322x make a complete SAT. Although HMB 316 is shown, it is to be understood that the embodiments described herein may be applicable to storage systems not including HMB access. Likewise, it is to be understood that all of the SAT (i.e., the first SAT 324a and the second SAT 324b) may be stored in either the HMB 316 or the NVM 320 or both the HMB 316 and the NVM 320. In cases where a portion of the SAT is stored in the HMB 316, the controller 302 may program updates or portions of the second SAT 324b to the HMB 316 for quicker access.

The controller 302 includes a volatile memory 306, which may be the second volatile memory 120 of FIG. 1, and a flash translation layer (FTL) 304. The FTL 304 may be responsible for generating and maintaining mappings of a logical block address (LBA) to a corresponding physical block address (PBA) in a logical to physical (L2P) table or a SAT (e.g., the first SAT 324a and the second SAT 324b). For example, when a write command is received from a host device, such as the host device 104, the write command may include a LBA. When the data of the write command is stored in the NVM 320, the FTL 304 generates a mapping associating the LBA of the write command with the PBA of the data stored in the NVM 320. When a data management operation occurs, such as a garbage collection operation, the FTL 304 may be configured to generate a new mapping or update a mapping associated with the respective LBA/PBA pair.

The volatile memory 306 includes a CAT 308 and a temporary CAT 312. It is to be understood that in data storage devices including a DRAM coupled to the controller, the CAT 308 and/or the temporary CAT 312 may be stored in the DRAM coupled to the controller. It is to be further understood that in data storage devices including a DRAM coupled to the controller, the CAT 308 and/or the temporary CAT 312 may be stored in the controller. The CAT 308 includes a plurality of mSets 310a-310n and the temporary CAT 312 includes a plurality of temporary cache buffers 314a-314f, where each of the plurality of temporary cache buffers 314a-314f may include one or more mSets of the plurality of mSets 318a-318i and/or one or more mSets of the plurality of mSets 322a-322x.

Because the SAT may require a large or significant amount of storage space, the SAT may be stored in a distanced memory, such as in the HMB 316 or the NVM 320. It is to be understood that the term "distanced memory" refers to memory that is outside of or distanced from the controller. As shown in FIG. 3, the first SAT 324a is stored in the HMB 316 and the second SAT 324b is stored in the NVM 320. Because the plurality of mSets 318a-318i, 322a-322x of the SAT 324a, 324b, respectively, are stored outside of the controller 302, access time of the mSets in the distanced memory may be slower than an access time of the volatile memory 306. When an mSet of the distanced memory is needed, a portion of the mSet, such in a size of 128 B, is read into one of the plurality of temporary cache buffers 314a-314f of the temporary CAT 312. In order to optimize performance of the controller 302, and, consequently, the data storage device, when executing read commands, the CAT 308 should hold the most popular (e.g., active) one or more mSets in order to avoid loading data from the distanced memories (e.g., the HMB 316 and the NVM 320) to the temporary CAT 312 and to the CAT 308. For example, if the CAT 308 holds half (e.g., about 50%) of the active range of mSets and half (e.g., about 50%) of the address translations performed are from the CAT 308, then the usage of the CAT 308 may be optimized or maximized. It is to be understood that the previously mentioned percentages is not intended to be limiting, but to provide an example of a possible embodiment. Furthermore, use of the term "about" may refer to a range of +/−5%.

Figures 4A, 4B:
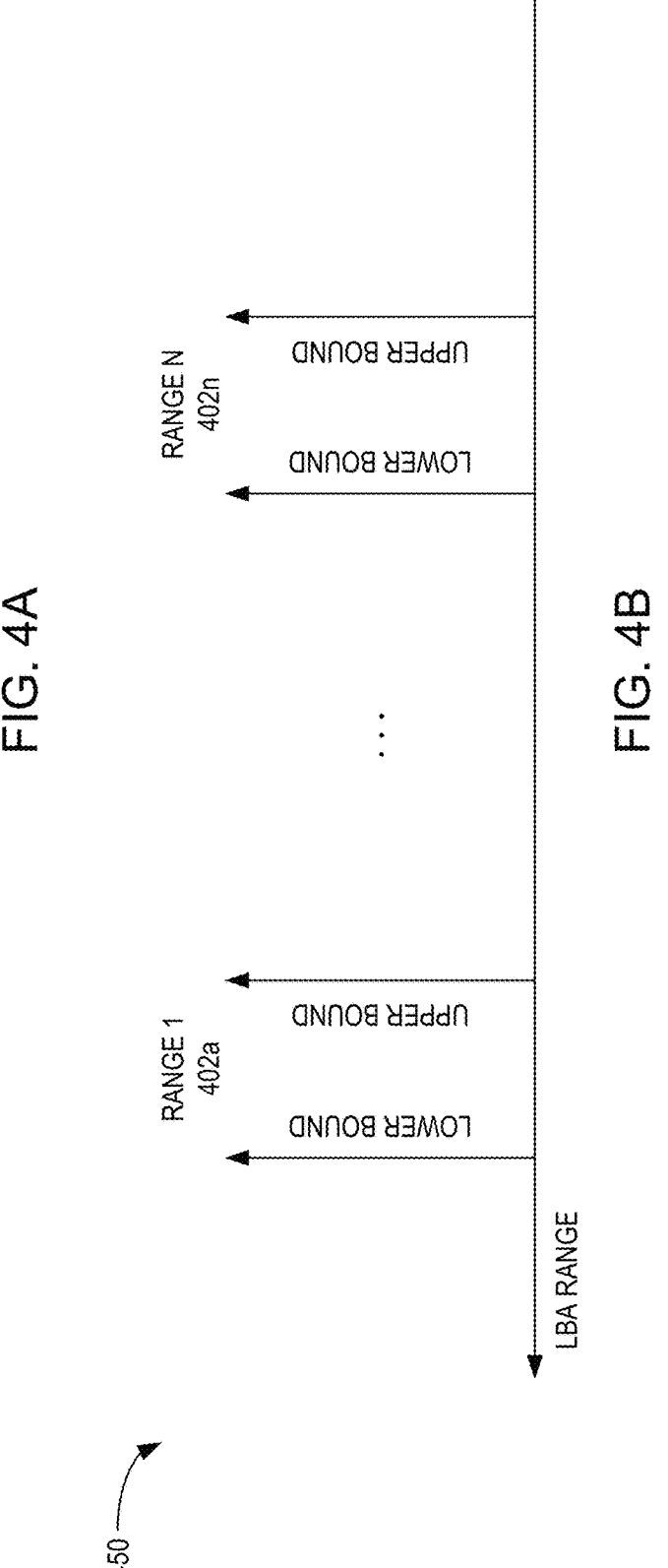
FIG. 4A is a table storing an upper bound, a lower bound, and statistics of each active range of a compressed address table (CAT), according to certain embodiments.
FIG. 4B is an illustration of one or more active ranges of a CAT, according to certain embodiments.

FIG. 4A is a table 400 storing an upper bound, a lower bound, and statistics of each active range of a compressed address table (CAT), which may be the CAT 308 of FIG. 3, according to certain embodiments. FIG. 4B is an illustration of one or more active ranges of an LBA range 450 of the CAT 308, according to certain embodiments. FIGS. 4A and 4B are described together herein. For exemplary purposes, aspects of FIG. 3 may be referenced herein.

Each boundary (i.e., the upper bound and the lower bound) of the LBA range 450 is indicated by an LBA #. For example, Range 1 402a may span from LBA 0 to LBA 128, where LBA 0 is the lower bound of the range and LBA 128 is the upper bound of the range. Furthermore, it is to be understood that although LBA range 450 is described, the embodiments described are applicable to mSets. For example, mSet 1 may span from LBA 0 to LBA 63 and mSet 2 may span from LBA 64 to LBA 128, where Range 1 includes both mSet 1 and mSet 2. In other words, each range comprises one or more mSets having consecutive LBA ranges.

The statistics column indicates the hit count of the range. For example, if the total number of read commands received by the controller 302 is 100 and 20 of the read commands include LBAs located in Range 1, then the hit count for Range 1 is 20 or 20%. When the number of read commands received exceeds a threshold number of read commands, the controller 302, based on the hit count, may either reset the boundaries one or more ranges of the LBA range 450 in order to find the relevant ranges changed across host input/output range changes. Likewise, two or more ranges of the LBA range 450 may be periodically merged to combine overlapped ranges, such as when the threshold number of read commands has been exceeded or when a secondary threshold number of read commands received has been exceeded. The threshold number of read commands and the secondary threshold number of read commands may be a configurable number of commands based on data storage device statistics, current workload, number of commands received over a sliding window of time, and the like. It is to be understood that the previously listed configuration parameters are not intended to be limiting, but to provide an example of a possible embodiment.

When a read command is received by the controller 302, the controller 302 checks the LBA associated with the read command against the boundaries in the table 400. If the relevant LBA is not located in the table 400, then the controller 302 retrieves the relevant mSet having the relevant LBA from the SAT (e.g., the first SAT 324a or the second SAT 324b) and checks the boundaries (e.g., the upper LBA boundary and the lower LBA boundary) of the relevant mSet. The controller 302 then determines if the boundaries of the relevant mSet is consecutive to either a lower bound or an upper bound of an existing active range in the table 400. If the relevant mSet is consecutive to either a lower bound or an upper bound of an existing active range in the table 400, then the controller 302 adds the relevant mSet to the CAT 308 and updates the table 400 to reflect the addition (i.e., a new upper bound or a new lower bound).

Figures 5A, 5B:
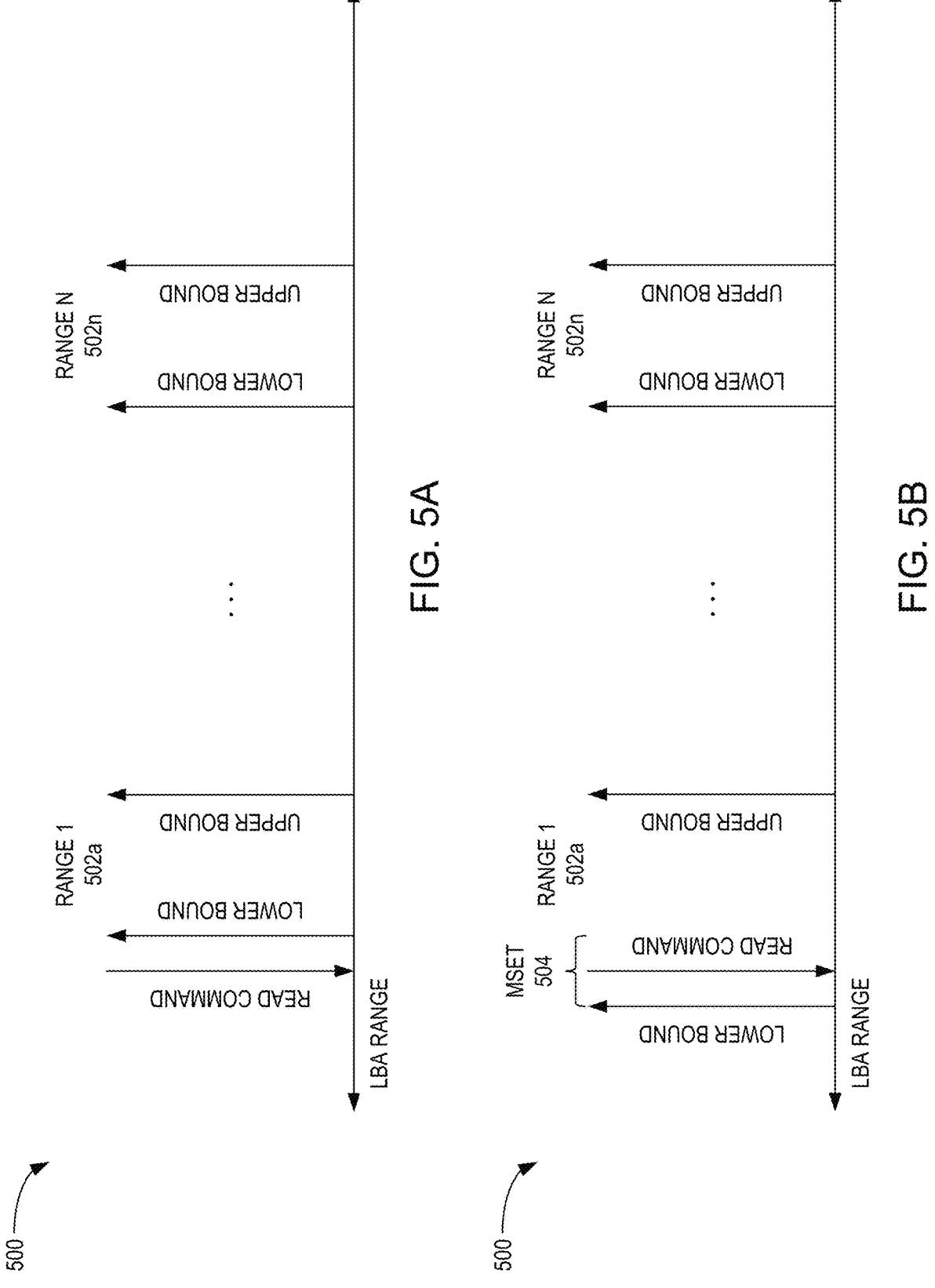
FIG. 5A is an illustration of receiving a read command that is outside of an active range of an LBA range, according to certain embodiments.
FIG. 5B is an illustration of adjusting the relevant active range of the LBA range based on the received read command, according to certain embodiments.

FIG. 5A is an illustration of receiving a read command that is outside of an active range of an LBA range 500, according to certain embodiments. FIG. 5B is an illustration of adjusting the relevant active range of the LBA range 500 based on the received read command, according to certain embodiments. FIGS. 5A and 5B are described together herein. For exemplary purposes, aspects of FIG. 3 may be referenced herein.

As shown in FIG. 5A, a read command is received, where a corresponding LBA of the read command is not within any of the actives ranges (e.g., Range 1 502a, Range N 502n) of the LBA range 500. Thus, the controller 302 searches for a relevant mSet in the SAT 324 that includes the LBA of the read command. It is to be understood that reference to "LBA" may refer to "one or more LBAs". When the controller 324 finds the relevant mSet in the SAT 324, the controller 302 retrieves the relevant mSet and stores the relevant mSet in the temporary CAT 312. The controller 302 determines whether the retrieved mSet is consecutive to any of the active ranges (e.g., Range 1 502a, Range N 502n) of the LBA range 500.

As shown in FIG. 5B, mSet 504 includes the LBA of the read command. Because mSet 504 is consecutive to Range 1 502a, the controller 302 stores the mSet 504 to the CAT

308 and changes a boundary (i.e., the lower bound) of the active range, Range 1 502a, from to include the LBAs of mSet 504.

Figure 6:
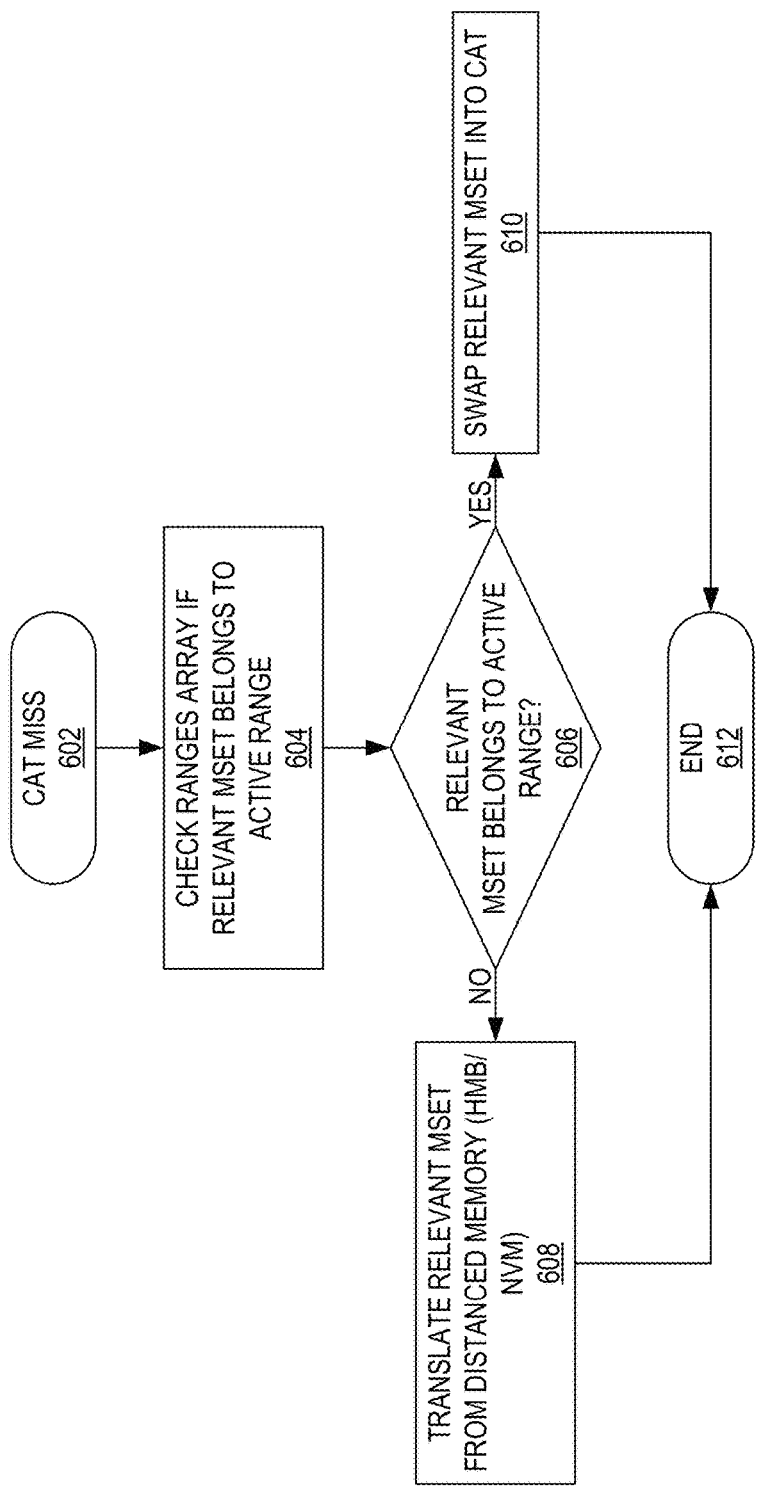
FIG. 6 is a flow diagram illustrating a method of adjusting an active range of one or more active ranges of a CAT, according to certain embodiments.

FIG. 6 is a flow diagram illustrating a method 600 of adjusting an active range of one or more active ranges of a CAT, according to certain embodiments. Method 600 may be implemented by a controller, such as the controller 108 of FIG. 1 or the controller 302 of FIG. 3. For exemplary purposes, aspects of FIG. 3 may be referenced herein. At block 602, the controller 302 determines that a CAT miss has occurred, such that a read address or LBA associated with a read command is not stored in the CAT 308. At block 604, the controller 302 checks the ranges array of the CAT 308 to determine whether the relevant mSet belongs to the active range. At block 606, the controller 302 determines whether the relevant mSet belongs to the active range. If the relevant mSet does not belong to the active range at block 606, then the controller 302 translates the relevant mSet from the distanced memory (e.g., the NVM 320 or the HMB 316) at block 608. However, if the relevant mSet does belong to the active range at block 606, then the controller 302 swaps the relevant mSet into the CAT 308. For example the relevant mSet may be located in the temporary CAT 312. At block 612, method 600 completes.

By actively adjusting an upper bound or a lower bound of an LBA range, that includes one or more mSets, of a compressed address table, processing read commands may be completed more efficiently.

In one embodiment, a data storage device includes a memory device and a controller coupled to the memory device. The controller is configured to determine that an address associated with a received read command is not stored in a compressed address table (CAT) of the data storage device, where the CAT comprises one or more ranges, wherein each of the one or more ranges corresponds with at least an mSet of a storage address table (SAT), update either a lower bound or an upper bound of a range of the one or more ranges based on the address, where the range that is updated is closest to the address associated with the received read command, retrieve one or more mSets from the SAT based on the updating, where the retrieved one or more mSets comprises the address associated with the received read command, and store the retrieved one or more mSets in the CAT for subsequent address translation requests, where the controller is further configured to scan the CAT for the subsequent address translation requests.

The SAT is stored in a non-volatile memory device of the data storage device. The SAT is stored in a host memory buffer (HMB) of a host device. A first portion of the SAT is stored in a non-volatile memory device of the data storage device and a second portion of the SAT is stored in a host memory buffer (HMB) of a host device. The one or more ranges are reset after a predetermined number of address translation requests have been serviced. The controller is further configured to merge overlapping ranges of the one or more ranges. The CAT is stored in volatile memory of the data storage device. The data storage device is dynamic random access memory (DRAM)-less. The updating occurs when the address associated with the read command is sequential to the range of the one or more ranges based on the address.

In another embodiment, a data storage device includes a non-volatile memory device, a volatile memory device, and a controller coupled to the non-volatile memory device and the volatile memory device. The volatile memory device includes a compressed address table (CAT). The CAT stores a portion of a storage address table (SAT). The SAT stores logical block address (LBA) to physical block address (PBA) mappings. The CAT stores one or more ranges of LBA to PBA mappings. The controller is configured to determine that an address associated with a read command is not stored in the CAT, determine if the address associated with the read command is sequential to one of the one or more ranges of LBA to PBA mappings of the CAT when the address associated with the read command is not stored in the CAT, and retrieve and store an mSet storing an LBA to PBA mapping corresponding to the address associated with the read command in the CAT when the address associated with the read command is sequential to one of the one or more ranges of LBA to PBA mappings of the CAT.

The portion is a copy of data stored in the SAT. The volatile memory device is disposed in the controller. The volatile memory further comprises a temporary CAT. The controller is further configured to retrieve and store the mSet storing the LBA to PBA mapping corresponding to the address associated with the read command in the temporary CAT when the address associated with the read command is not sequential to one of the one or more ranges of LBA to PBA mappings of the CAT. The controller is further configured to receive another read command corresponding to the mSet stored in the temporary CAT and copy the mSet stored in the temporary CAT to the CAT. The controller is further configured to maintain an access count of each of the one or more ranges. The controller is further configured to reset a range of the one or more ranges after a number of read commands have been processed. The range that is reset is determined by the access count. The one or more ranges is two or more ranges, wherein the controller is further configured to determine that a first range of the two or more ranges and a second range of the two or more ranges are consecutive or overlapping and merge the first range and the second range.

In another embodiment, a data storage device includes means for storing data and a controller coupled to the means for storing data. The controller is configured to adjust a stored range of mSets in a compressed address table (CAT) based on determining that an mSet comprising an address associated with a read command is sequential to the stored range. The mSet is retrieved from a storage address table (SAT) stored in the means for storing data or a host memory buffer (HMB) of a host device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
determine that an address associated with a received read command is not stored in a compressed address table (CAT) of the data storage device, wherein the CAT comprises one or more ranges, wherein each of the one or more ranges corresponds with at least an mSet of a storage address table (SAT); and
update either a lower bound or an upper bound of a range of the one or more ranges based on the address, wherein the range that is updated is closest to the address associated with the received read command.

2. The data storage device of claim 1, wherein the SAT is stored in a non-volatile memory device of the data storage device.

3. The data storage device of claim 1, wherein the SAT is stored in a host memory buffer (HMB) of a host device.

4. The data storage device of claim 1, wherein a first portion of the SAT is stored in a non-volatile memory device of the data storage device and a second portion of the SAT is stored in a host memory buffer (HMB) of a host device.

5. The data storage device of claim 1, wherein the one or more ranges are reset after a predetermined number of address translation requests have been serviced.

6. The data storage device of claim 1, wherein the controller is further configured to merge overlapping ranges of the one or more ranges.

7. The data storage device of claim 1, wherein the CAT is stored in volatile memory of the data storage device.

8. The data storage device of claim 1, wherein the data storage device is dynamic random access memory (DRAM)-less.

9. The data storage device of claim 1, wherein the updating occurs when the address associated with the read command is sequential to the range of the one or more ranges based on the address.

10. A data storage device, comprising:
a non-volatile memory device;
a volatile memory device, wherein:
the volatile memory device comprises a compressed address table (CAT), wherein the CAT stores a portion of a storage address table (SAT), wherein the SAT stores logical block address (LBA) to physical block address (PBA) mappings, and wherein the CAT stores one or more ranges of LBA to PBA mappings; and
a controller coupled to the non-volatile memory device and the volatile memory device, wherein the controller is configured to:
retrieve and store an mSet storing an LBA to PBA mapping corresponding to an address associated with a read command in the CAT when the address associated with the read command is sequential to one of one or more ranges of LBA to PBA mappings of the CAT.

11. The data storage device of claim 10, wherein the portion is a copy of data stored in the SAT.

12. The data storage device of claim 10, wherein the volatile memory device is disposed in the controller.

13. The data storage device of claim 10, wherein the volatile memory further comprises a temporary CAT.

14. The data storage device of claim 13, wherein the controller is further configured to retrieve and store the mSet storing the LBA to PBA mapping corresponding to the address associated with the read command in the temporary CAT when the address associated with the read command is not sequential to one of the one or more ranges of LBA to PBA mappings of the CAT.

15. The data storage device of claim 14, wherein the controller is further configured to:
receive a read command corresponding to the mSet stored in the temporary CAT; and
copy the mSet stored in the temporary CAT to the CAT.

16. The data storage device of claim 10, wherein the controller is further configured to maintain an access count of each of the one or more ranges.

17. The data storage device of claim 16, wherein the controller is further configured to reset a range of the one or more ranges after a number of read commands have been processed, wherein the range that is reset is determined by the access count.

18. The data storage device of claim 10, wherein the one or more ranges is two or more ranges, wherein the controller is further configured to:

determine that a first range of the two or more ranges and a second range of the two or more ranges are consecutive or overlapping; and merge the first range and the second range.

19. The data storage device of claim 10, wherein the controller is further configured to determine that a CAT miss has occurred.

20. The data storage device of claim 19, wherein controller is further configured to check a ranges array to determine whether a relevant mSet belongs to an active range.

\* \* \* \* \*